(12) United States Patent
Sasaki (10) Patent No.: US 12,387,355 B2
(45) Date of Patent: Aug. 12, 2025

(54) GUIDANCE SYSTEM, CONTROL METHOD OF GUIDANCE SYSTEM, AND CONTROL PROGRAM OF GUIDANCE SYSTEM

(71) Applicant: Topcon Corporation, Tokyo (JP)

(72) Inventor: Takeshi Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 996 days.

(21) Appl. No.: 17/448,208

(22) Filed: Sep. 21, 2021

(65) Prior Publication Data
US 2022/0092810 A1    Mar. 24, 2022

(30) Foreign Application Priority Data
Sep. 24, 2020   (JP) ................................ 2020-160223

(51) Int. Cl.
| | |
|---|---|
| *G06T 7/579* | (2017.01) |
| *G01S 7/51* | (2006.01) |
| *G01S 17/89* | (2020.01) |
| *G06T 1/00* | (2006.01) |
| *G06T 19/00* | (2011.01) |

(52) U.S. Cl.
CPC ............... *G06T 7/579* (2017.01); *G01S 7/51* (2013.01); *G01S 17/89* (2013.01); *G06T 1/0007* (2013.01); *G06T 19/003* (2013.01)

(58) Field of Classification Search
CPC ..... G06T 7/579; G06T 1/0007; G06T 19/003; G01S 7/51; G01S 17/89; G01C 15/002; G01C 11/04
USPC ......................................................... 701/400
See application file for complete search history.

(56) References Cited

U.S. PATENT DOCUMENTS

| | | | |
|---|---|---|---|
| 10,294,635 B2 * | 5/2019 | Kurogi ...................... | B60R 1/28 |
| 10,895,456 B1 * | 1/2021 | Nakamura ............... | G01C 3/04 |

(Continued)

FOREIGN PATENT DOCUMENTS

| | | | |
|---|---|---|---|
| EP | 1584895 | * | 10/2005 |
| EP | 1584895 A1 | | 10/2005 |

(Continued)

OTHER PUBLICATIONS

Extended European Search Report mailed Feb. 18, 2022, in connection with European Patent Application No. 21197967.9, 7 pgs.

(Continued)

*Primary Examiner* — Muhammad Shafi
(74) *Attorney, Agent, or Firm* — Chiesa Shahinian & Giantomasi PC (57) ABSTRACT

An object of the present invention is to provide a guidance system and the like which are capable of showing an object from a point of view of an operator in an accurate manner when displaying the object on a display portion. A guidance system includes: a survey apparatus that surveys an object from a point of view that differs from a point of view of a user; and a display portion that displays the object from the point of view of the user, wherein the survey apparatus is configured to perform ranging by irradiating the object with ranging light and receiving reflected ranging light from the object, and survey information of the object having been surveyed by the survey apparatus is changed to the point of view of the user and displayed on the display portion.

7 Claims, 11 Drawing Sheets

(56) References Cited

U.S. PATENT DOCUMENTS

| | | | | |
|---|---|---|---|---|
| 2013/0096873 A1* | 4/2013 | Rosengaus | ........... | G01C 15/002 |
| | | | | 702/155 |
| 2019/0003155 A1* | 1/2019 | Kurogi | ...................... | B60R 1/28 |
| 2021/0080578 A1* | 3/2021 | Ito | ........................ | G01C 15/002 |
| 2021/0214922 A1* | 7/2021 | Yamashita | ............. | B60K 35/10 |

FOREIGN PATENT DOCUMENTS

| | | | |
|---|---|---|---|
| EP | 3644012 | * | 4/2020 |
| EP | 3644012 A2 | | 4/2020 |
| JP | 2014055407 A | | 3/2014 |
| JP | 2019132062 A | | 8/2019 |
| JP | 2019145953 A | | 8/2019 |
| WO | 2017191853 A1 | | 11/2017 |

OTHER PUBLICATIONS

Notice of Reasons for Refusal mailed Aug. 21, 2024 in connection with Japanese Patent Application No. 2020-160223, 13 pgs. (including translation).

* cited by examiner

GUIDANCE SYSTEM, CONTROL METHOD OF GUIDANCE SYSTEM, AND CONTROL PROGRAM OF GUIDANCE SYSTEM

BACKGROUND OF THE INVENTION

1. Field of the Invention

The present invention relates to a guidance system that provides guidance on operations of an operator or the like who operates a work machine or the like, a control method of the guidance system, and a control program of the guidance system.

2. Description of the Related Art

Conventionally, proposals have been made for displaying, when operating an apparatus such as a work machine, reference information for guidance to assist operations on a display or the like visible to an operator of the apparatus (for example, WO 2017/191853).

SUMMARY OF THE INVENTION

However, the proposal has a problem in that, when displaying reference information such as blind spot information of an operator on the display, since shapes viewed from various angles that differ from a point of view of the operator are displayed as the reference information, it is difficult for the operator to promptly ascertain a situation or the like. In addition, there is also a problem in that, when displaying external information or the like imaged by a camera on the display in order to enable the operator to ascertain the external information, for example, an image taken by the camera does not enable the operator to clearly ascertain a depth or the like of a structure or the like that is external information.

In consideration thereof, an object of the present invention is to provide a guidance system capable of showing an object from a point of view of an operator in an accurate manner when displaying the object on a display portion, a control method of the guidance system, and a control program of the guidance system.

According to the present invention, the object described above can be achieved by a guidance system including: a survey apparatus that surveys an object from a point of view that differs from a point of view of a user; and a display portion that displays the object from the point of view of the user, wherein the survey apparatus is configured to perform ranging by irradiating the object with ranging light and receiving reflected ranging light from the object, and survey information of the object having been surveyed by the survey apparatus is changed to the point of view of the user and displayed on the display portion.

According to the configuration described above, since the information on the object to be displayed on the display portion is survey information (for example, three-dimensional shape information), shape information of the object is accurately displayed on the display portion. In addition, since the survey information of the object to be displayed on the display portion is displayed after being changed to the point of view of the user, the system enables the user to readily ascertain the object.

Preferably, the guidance system includes: a survey apparatus-side imaging apparatus that images the object from a survey point of view of the survey apparatus; and a user-side imaging apparatus that images the object from the point of view of the user, wherein based on information on a relative positional attitude between the survey apparatus-side imaging apparatus and the user-side imaging apparatus, the survey information of the survey apparatus is changed to the point of view of the user and displayed on the display portion.

According to the configuration described above, based on information on a relative positional attitude between the survey apparatus-side imaging apparatus and the user-side imaging apparatus such as relative positional attitude information obtained by restoring a shape of the object portrayed in images acquired by both imaging apparatuses using a method of SfM (Structure from Motion) or the like and estimating positional attitudes of both imaging apparatuses, survey information is changed to the point of view of the user and displayed on the display portion. Therefore, survey information of the survey apparatus can be accurately changed to the point of view of the user.

Preferably, the survey apparatus is configured to be capable of generating shape information of the object by irradiating at least only one of the object and a peripheral direction thereof with the ranging light of the survey apparatus and receiving the reflected ranging light from the object, and acquiring three-dimensional information of the object by selecting and executing an irradiation method of the ranging light that is suitable for the generated shape information.

According to the configuration described above, since the survey apparatus generates shape information of a circle or the like and subsequently selects an irradiation method (for example, a circular shape) that is suitable for the shape information, three-dimensional information of the object can be acquired by irradiation of only a necessary portion by the ranging light, thereby enabling a prompt and efficient survey to be performed. In particular, in the configuration described above, since scanning involving irradiating ranging light can be uniformly performed within a desired range, reliability of acquired information improves.

Preferably, the guidance system acquires information on a target position to which the object is to be moved and displays difference information between present position information and the target position information on the display portion in the point of view of the user.

According to the configuration described above, since the difference information (for example, a direction in which the object is to be moved, an inclination of the object, or the like) between the present position information and the target position information can be displayed on the display portion in the point of view of the user, guidance information that is appropriate to the user can be provided.

According to the present invention, the object described above can be achieved by a control method of a guidance system including a survey apparatus that surveys an object from a point of view that differs from a point of view of a user and a display portion that displays the object from the point of view of the user, the control method of a guidance system including: having the survey apparatus perform ranging by irradiating the object with ranging light and receiving reflected ranging light from the object; and changing survey information of the object having been surveyed by the survey apparatus to the point of view of the user and displaying the survey information on the display portion.

According to the present invention, the object described above can be achieved by a control program of a guidance system including a survey apparatus that surveys an object from a point of view that differs from a point of view of a user and a display portion that displays the object from the point of view of the user, the control program causing the guidance system to execute functions of: having the survey apparatus perform ranging by irradiating the object with ranging light and receiving reflected ranging light from the object; and changing survey information of the object having been surveyed by the survey apparatus to the point of view of the user and displaying the survey information on the display portion.

The present invention advantageously provides a guidance system capable of showing an object from a point of view of an operator in an accurate manner when displaying the object on a display portion, a control method of the guidance system, and a control program of the guidance system.

DESCRIPTION OF THE PREFERRED EMBODIMENTS

Hereinafter, a preferred embodiment of the present invention will be described in detail with reference to accompanying drawings and the like. Although the embodiment described below is a preferred specific example of the present invention and therefore involves various favorable technical limitations, it is to be understood that the scope of the present invention is by no means limited by the described aspects unless specifically noted otherwise hereinafter.

Overall Configuration of Guidance System 1

Figure 1:
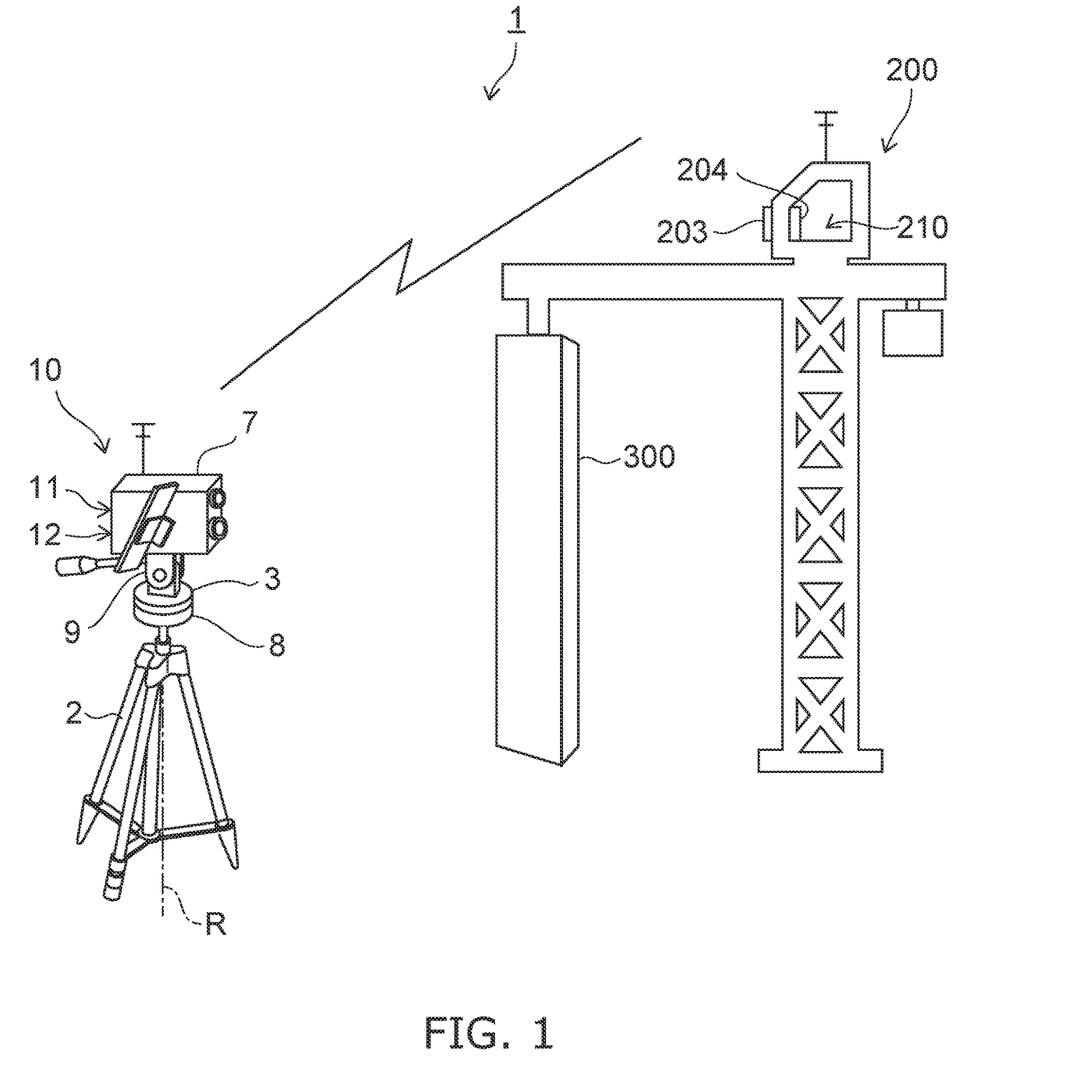
FIG. 1 is a schematic view showing a guidance system 1 according to an embodiment of the present invention.

FIG. 1 is a schematic view showing a guidance system 1 according to an embodiment of the present invention. For example, the guidance system 1 shown in FIG. 1 includes a crane 200 for suspending an object such as a rebar 300 and moving the rebar 300 to a target position, a crane-side display 204 that is a display portion installed at an operator's seat 210 of the crane 200, and a crane camera 203 that is a user-side imaging apparatus that images the outside, particularly including the rebar 300 and a periphery thereof, in a point of view of, for example, an operator who is a user to sit on the operator's seat 210 and operate the crane 200.

The crane-side display 204 is configured as a "touch panel-type display" including a touch panel that is an electronic component combining a display portion such as a display and a position input apparatus, and the crane-side display 204 constitutes an input apparatus that enables the operator to input various kinds of information by touching displays on the display.

The present system 1 also includes a survey apparatus 10 which surveys the rebar 300 being suspended by the crane 200 in a different direction from the crane 200 and which is provided with, for example, a survey apparatus camera 27 (imaging unit) (refer to FIG. 4 and the like) that is a survey apparatus-side imaging apparatus that images the rebar 300 and a periphery thereof.

In addition, the crane 200 shown in FIG. 1 includes a crane-side communication apparatus 202 (refer to FIG. 3) for communicating with the survey apparatus 10 and the like, the survey apparatus 10 also includes a survey apparatus-side communication apparatus 101 for communicating with the crane 200 and the like, and the crane-side communication apparatus 202 and the survey apparatus-side communication apparatus 101 are configured to be capable of communicating with each other.

Main Hardware Configuration Etc. Of the Survey Apparatus 10

Next, a main hardware configuration and the like of the "survey apparatus 10" shown in FIG. 1 will be described. As shown in FIG. 1, the survey apparatus 10 is provided via a base unit 3 on a tripod 2 installed at an installation reference point R and is configured to be capable of three-dimensional measurement (survey) of a measurement object such as the rebar 300.

The base unit 3 of the survey apparatus 10 has a protractor plate 8 which rotates in a horizontal direction and which is capable of detecting a rotational angle and a vertical rotation portion 9 which is capable of rotating in a vertical direction and which can be fixed at a predetermined angle and, consequently, the survey apparatus 10 is configured to be directly attached to the vertical rotation portion 9. Therefore, the survey apparatus 10 is also configured so as to rotate in the vertical direction around a machine reference point and rotate in the horizontal direction around the machine reference point.

Main Hardware Configuration Inside Enclosure 7 of Survey Apparatus 10

Figure 2:
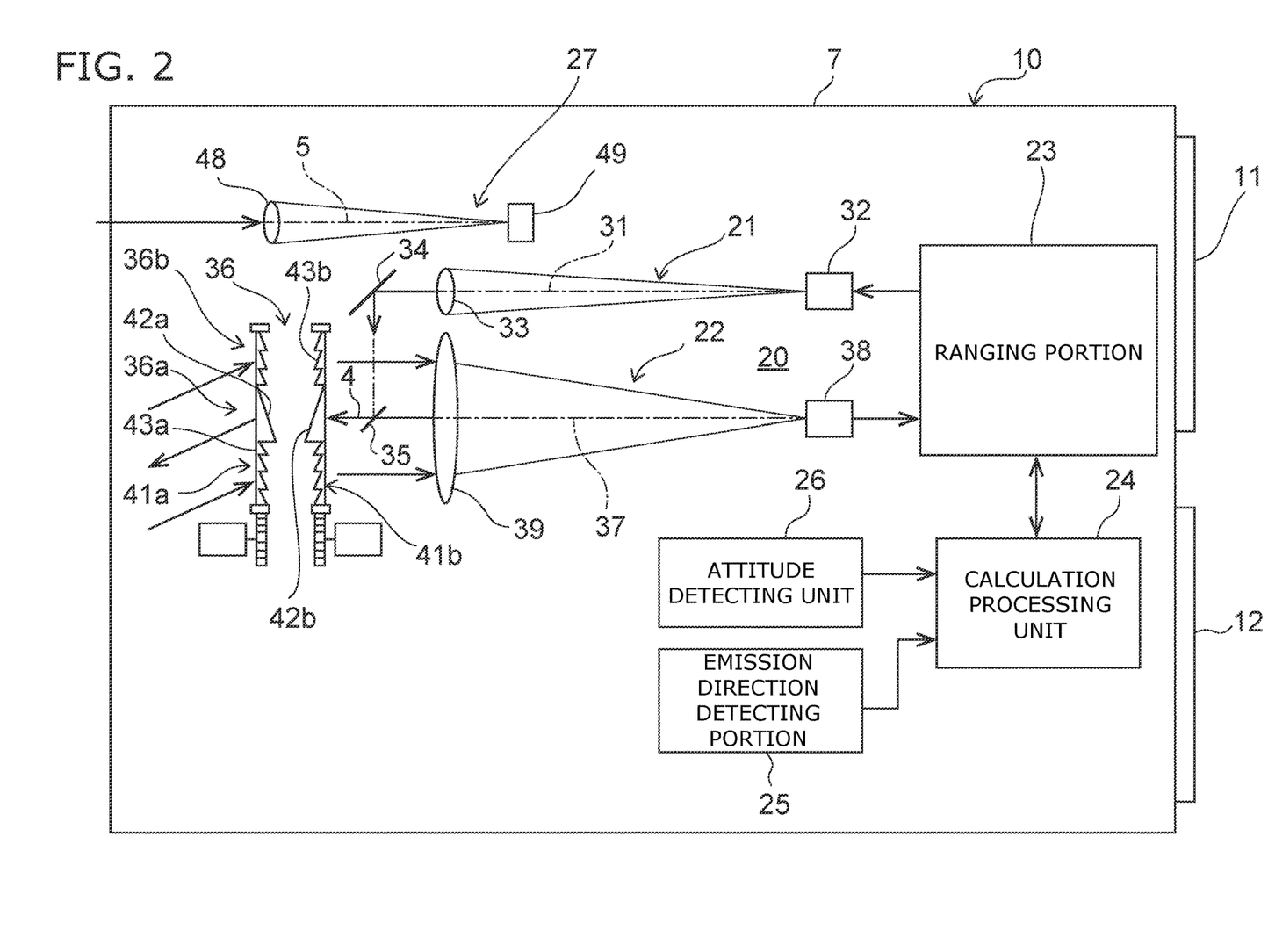
FIG. 2 is a schematic view showing a main internal structure of an enclosure 7 of a survey apparatus 10 shown in FIG. 1.

FIG. 2 is a schematic view showing a main internal structure of the enclosure 7 of the survey apparatus 10 shown in FIG. 1. As shown in FIG. 2, a survey apparatus-side display portion 11 and an operating portion 12 are provided on a rear surface of the enclosure 7 and a measurement unit 20 having a ranging optical axis 4, a calculation processing unit 24, an emission direction detecting portion 25 that detects an emission direction of ranging light, an attitude detecting unit 26 that detects an inclination of the survey apparatus 10 in the horizontal direction, an imaging unit (a survey apparatus camera) 27 having an imaging optical axis 5, an optical axis deflecting unit 36 that detects the ranging optical axis 4, and the like are provided inside the enclosure 7.

In addition, as shown in FIG. 2, the measurement unit 20, the attitude detecting unit 26, the imaging unit 27, and the optical axis deflecting unit 36 are integrally arranged. The measurement unit 20 shown in FIG. 2 has a ranging light emitting portion 21, a light-receiving portion 22, and a ranging portion 23. The ranging light emitting portion 21 emits ranging light and has an emission optical axis 31, a light-emitting element 32 (such as a laser diode (LD)) is provided on the emission optical axis 31, and a projection lens 33 is further provided on the emission optical axis 31.

In addition, a first reflecting mirror 34 as a deflecting optical member is provided on the emission optical axis 31, and a second reflecting mirror 35 as a deflecting optical member is arranged on a reception optical axis 37 so as to face the first reflecting mirror 34. Due to the first reflecting mirror 34 and the second reflecting mirror 35, the emission optical axis 31 is configured so as to match the ranging optical axis 4. In addition, the optical axis deflecting unit 36 is arranged on the ranging optical axis 4.

While the light-receiving portion 22 shown in FIG. 2 receives reflected ranging light from the rebar 300 that is a measurement object, the light-receiving portion 22 has a reception optical axis 37 that is parallel to the emission optical axis 31 and the reception optical axis 37 is common to the ranging optical axis 4. A light-receiving element 38 such as a photodiode (PD) is provided on the reception optical axis 37 and an imaging lens 39 is also arranged on the reception optical axis 37. The imaging lens 39 focuses the reflected ranging light on the light-receiving element 38, and the light-receiving element 38 receives the reflected ranging light and generates a light reception signal. The light reception signal is input to the ranging portion 23.

Optical Axis Deflecting Unit 36 of Survey Apparatus 10

The optical axis deflecting unit 36 is arranged on an object side of the imaging lens 39 on the reception optical axis 37 shown in FIG. 2. The ranging portion 23 controls the light-emitting element 32 and causes the light-emitting element 32 to emit a laser beam as the ranging light. The ranging optical axis 4 is configured to be deflected by the optical axis deflecting unit 36 (a ranging light deflecting portion 36a) so as to direct the laser beam toward a ranging point (the rebar 300). Specifically, the laser beam is emitted toward the rebar 300 shown in FIG. 1, the reflected ranging light having been reflected by the rebar 300 that is a measurement object enters the light-receiving portion 22 via the optical axis deflecting unit 36 (a reflected ranging light deflecting portion 36b) and the imaging lens 39.

The reflected ranging light deflecting portion 36b re-deflects the ranging optical axis 4 having been deflected by the ranging light deflecting portion 36a so that the ranging optical axis 4 returns to its original state and causes the light-receiving element 38 to receive the reflected ranging light. The light-receiving element 38 sends a light reception signal to the ranging portion 23 and the ranging portion 23 performs ranging of the measurement point (the rebar 300) on the basis of the light reception signal from the light-receiving element 38.

As shown in FIG. 2, a pair of optical prisms 41a and 41b is arranged on the optical axis deflecting unit 36. Fresnel prisms that are used as the optical prisms 41a and 41b are respectively constituted by prism elements 42a and 42b arranged in parallel and a large number of prism elements 43a and 43b, and have a plate shape.

Trajectory Control of Laser Using Optical Axis Deflecting Unit 36

Ranging light is emitted from the light-emitting element 32 shown in FIG. 2, the ranging light is made into a parallel luminous flux by the projection lens 33, passes through the ranging light deflecting portion 36a (the prism elements 42a and 42b), and emitted toward the rebar 300 that is a measurement object. By passing through the ranging light deflecting portion 36a, the ranging light is deflected and emitted in a direction of the rebar 300 that is a necessary direction by the prism elements 42a and 42b.

In addition, the reflected ranging light having been reflected by the rebar 300 passes through and is incident to the reflected ranging light deflecting portion 36b (the prism elements 43a and 43b) and is focused on the light-receiving element 38 by the imaging lens 39. Subsequently, due to the reflected ranging light passing through the reflected ranging light deflecting portion 36b, an optical axis of the reflected ranging light is deflected by the prism elements 43a and 43b so as to match the reception optical axis 37. In other words, due to a combination of rotational positions of the prism element 42a and the prism element 42b, a deflection direction and a deflection angle of the ranging light to be emitted can be arbitrarily changed. Specifically, as will be described later, a configuration is adopted in which the ranging light constituted by a laser can be changed to a linear shape, a circular shape, an elliptical shape, a consecutive Z-shape (a zig-zag shape), or the like.

Survey Apparatus Camera (Imaging Unit) 27 of Survey Apparatus 10

As shown in FIG. 2, the survey apparatus camera (imaging unit) 27 has the imaging optical axis 5. A configuration is adopted in which an image of the rebar 300 can be acquired by, for example, orienting the imaging optical axis 5 toward the rebar 300 shown in FIG. 1. In addition, an imaging lens 48 and an imaging element 49 are provided on the imaging optical axis 5. The imaging element 49 is a CCD or a CMOS sensor which is an aggregate of pixels, and a position of each pixel on an image element can be specified. For example, a position of each pixel is specified in a coordinate system of which an origin is an optical axis of the survey apparatus camera 27.

While the hardware configuration of the survey apparatus 10 shown in FIGS. 1 and 2 is as described above, main components including software of the crane 200 and the survey apparatus 10 shown in FIG. 1 will be described below.

In addition, the crane 200 and the survey apparatus 10 shown in FIG. 1 have computers, and the computers include a CPU (Central Processing Unit), a RAM (Random Access Memory), a ROM (Read Only Memory), and the like (not illustrated) which are connected via a bus or the like.

Figure 3:
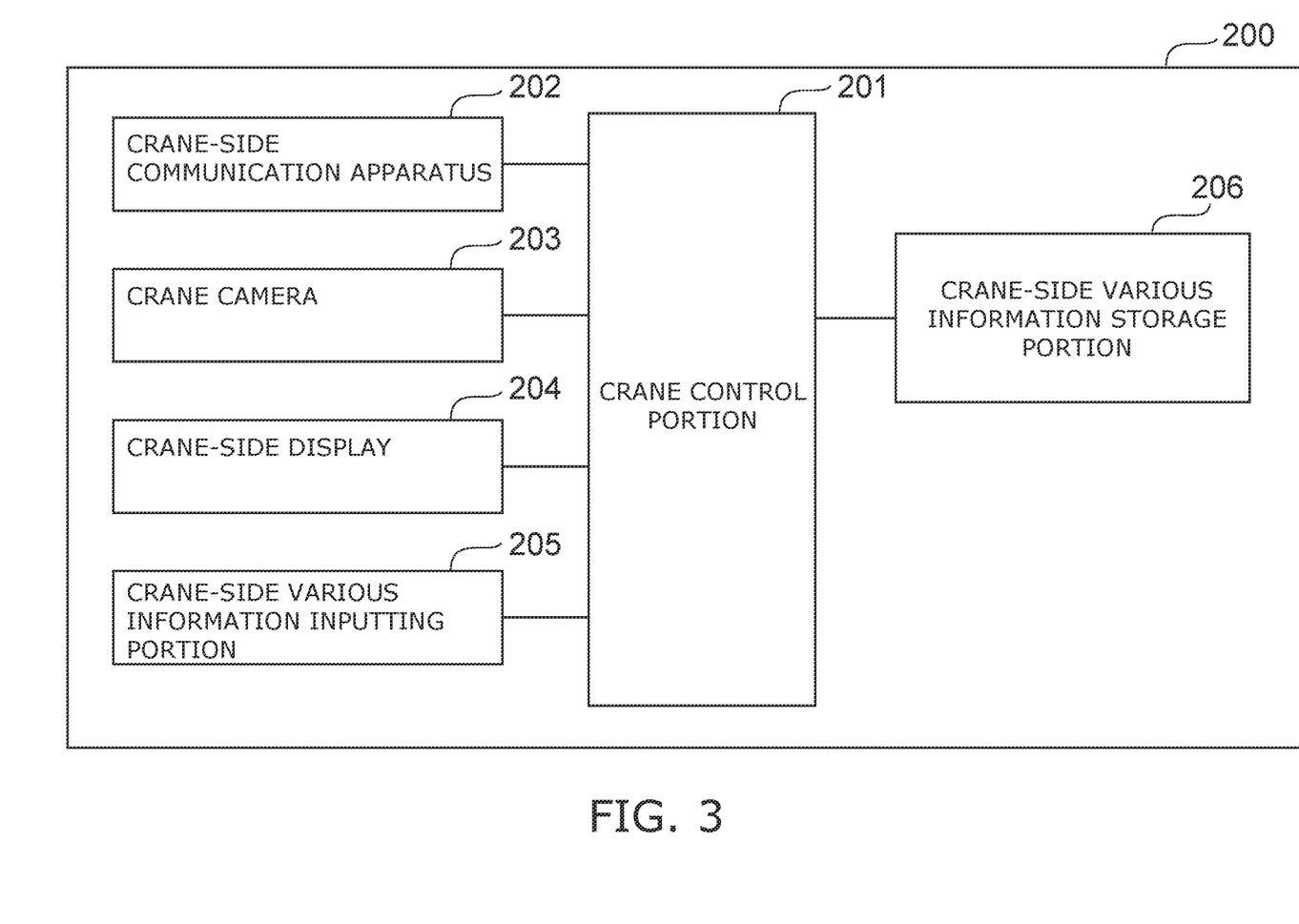
FIG. 3 is a schematic block diagram showing main components of a crane 200 shown in FIG. 1.

FIG. 3 is a schematic block diagram showing main components of the crane 200 shown in FIG. 1. As shown in FIG. 3, the crane 200 has a "crane control portion 201", and in addition to controlling the "crane-side communication apparatus 202", the "crane camera 203", the "crane-side display 204", and the like described above, the control portion 201 also controls a "crane-side various information input portion 205" and a "crane-side various information storage portion 206".

Figure 4:
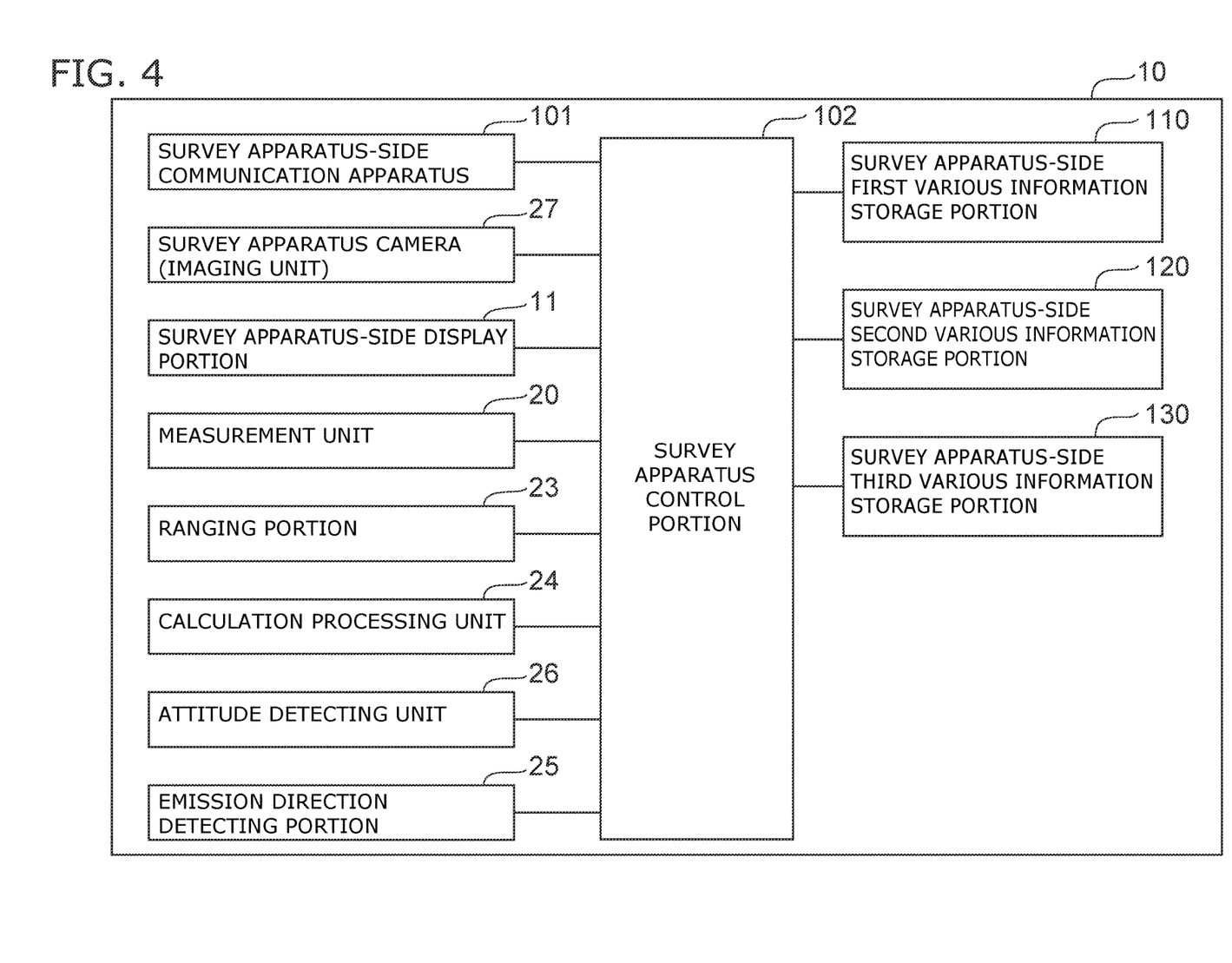
FIG. 4 is a schematic block diagram showing main components of the survey apparatus 10 shown in FIGS. 1 and 2.

FIG. 4 is a schematic block diagram showing main components of the survey apparatus 10 shown in FIGS. 1 and 2. As shown in FIG. 4, the survey apparatus 10 has a "survey apparatus control portion 102", and in addition to controlling the "survey apparatus-side communication apparatus 101", the "survey apparatus camera 27", the "survey apparatus-side display portion 11", the "measurement unit 20", the "ranging portion 23", the "calculation processing unit 24", the "attitude detecting unit 26", and the "emission direction detecting portion 25", the control portion 102 also controls a "survey apparatus-side first various information storage portion 110", a "survey apparatus-side second various information storage portion 120", and a "survey apparatus-side third various information storage portion 130".

Figure 5:
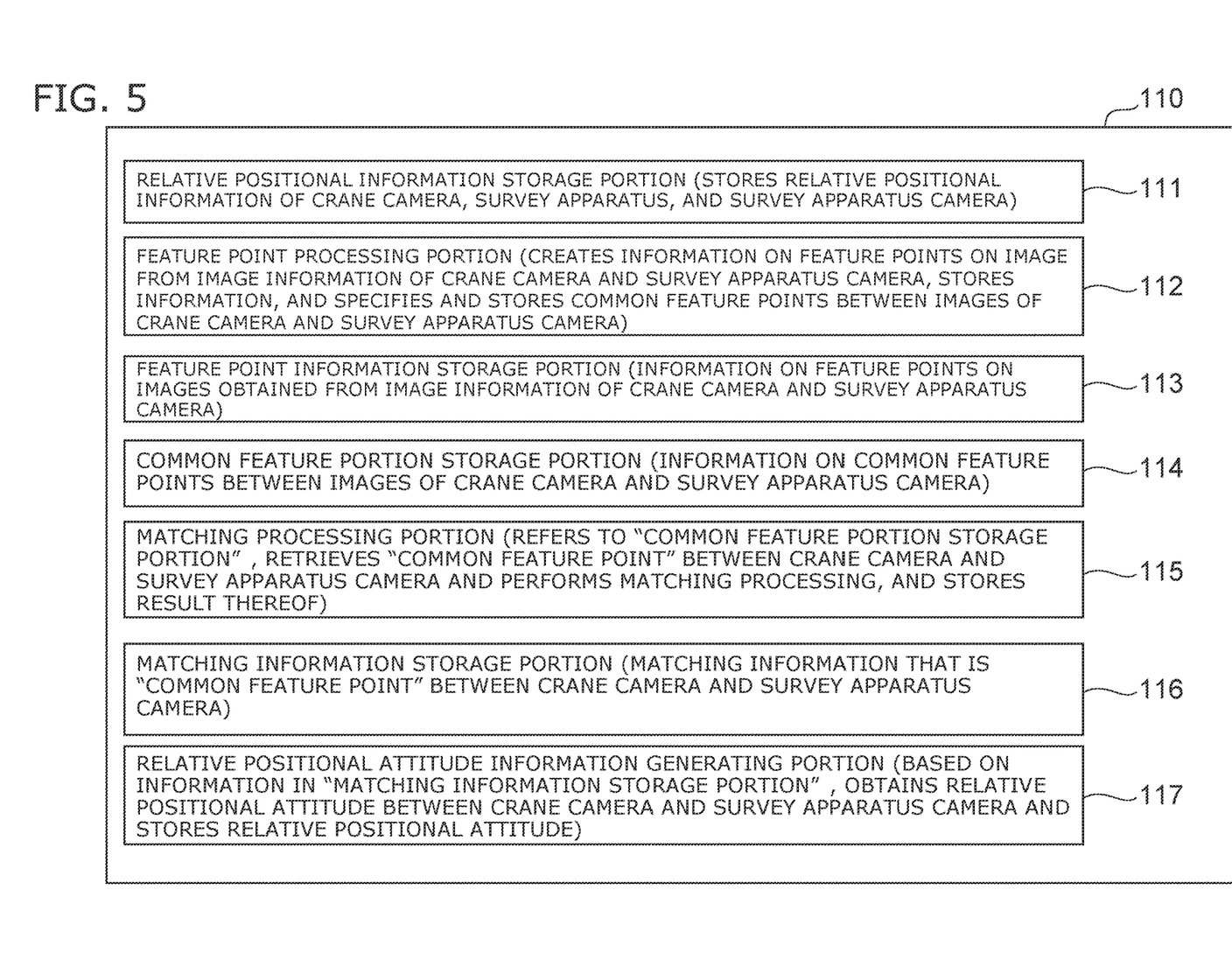
FIG. 5 is a schematic block diagram showing main components of a survey apparatus-side first various information storage portion 110.
Figure 6:
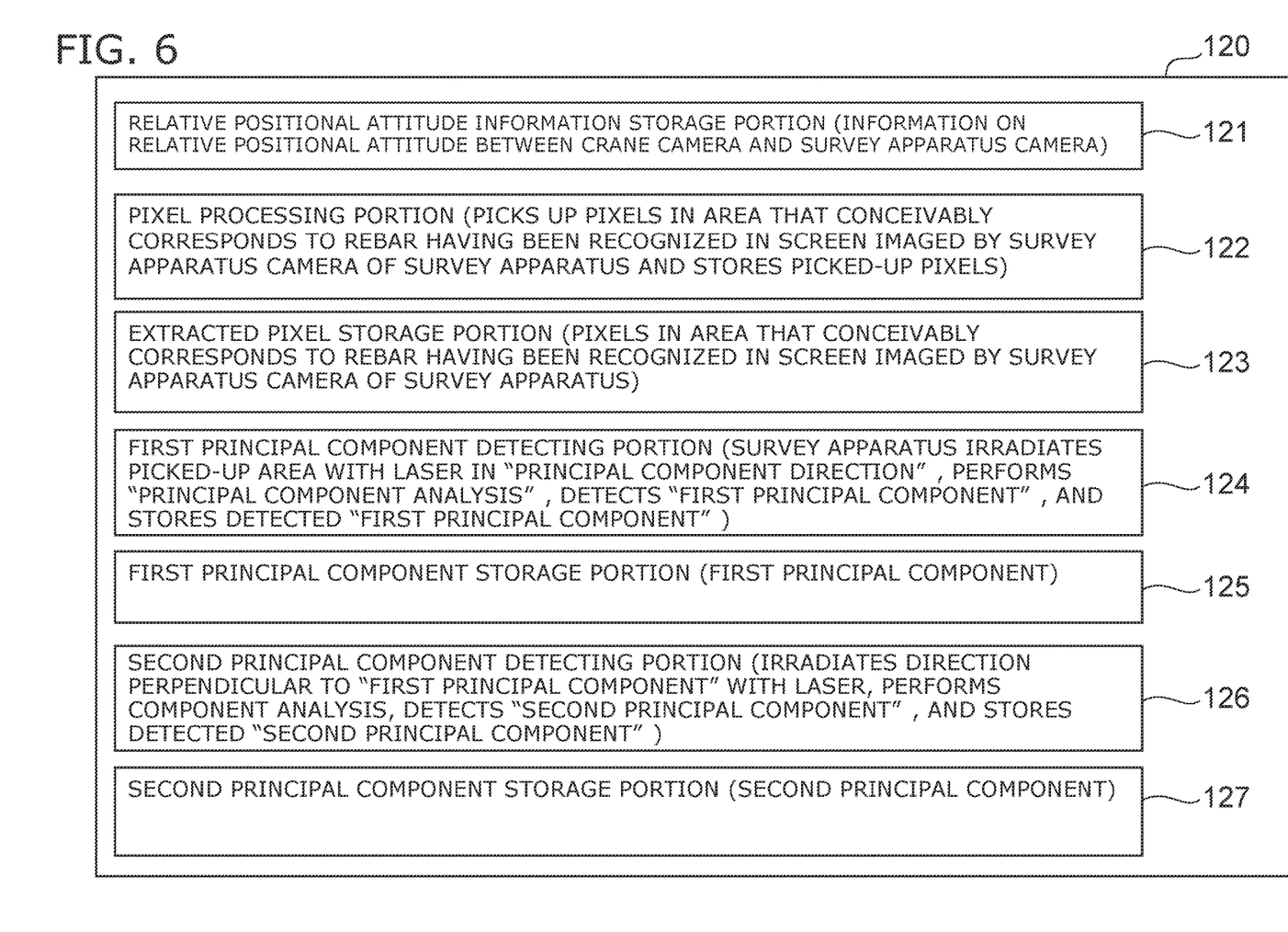
FIG. 6 is a schematic block diagram showing main components of a survey apparatus-side second various information storage portion.
Figure 7:
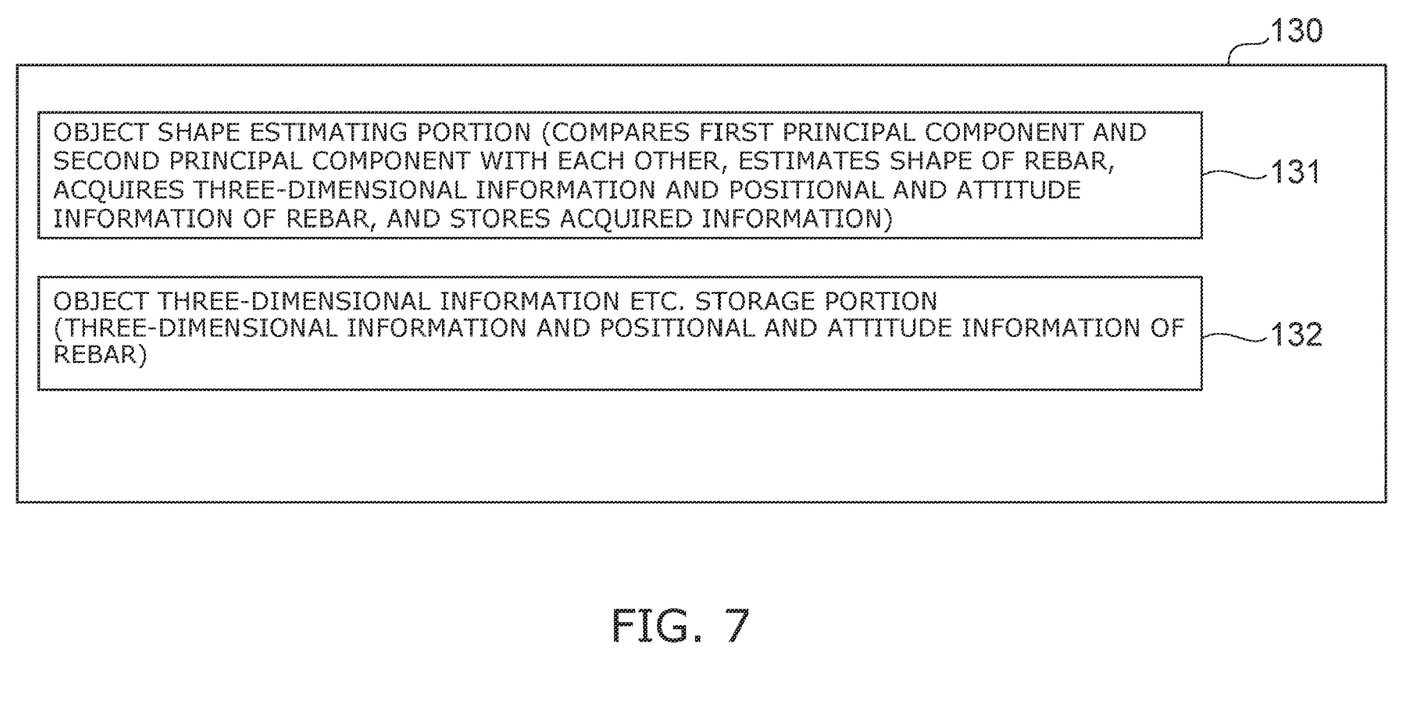
FIG. 7 is a schematic block diagram showing main components of a survey apparatus-side third various information storage portion.

FIGS. 5 to 7 are, respectively, schematic block diagrams showing main components of the "survey apparatus-side first various information storage portion 110", the "survey apparatus-side second various information storage portion 120", and the "survey apparatus-side third various information storage portion 130". Contents of these components will be described later. It should be noted that the "crane camera 203" shown in FIG. 1 and the "survey apparatus camera 27" shown in FIG. 2 are configured so that times of day can be synchronized with each other and acquisition of data can be executed at a designated time of day. In addition, the respective cameras 203 and 27 are also configured so as to be capable of acquiring an accurate time of day of photography using an GNSS (Global Navigation Satellite System) such as GPS (Global Positioning System) and accessing an NTP (Network Time protocol) server via an Internet network or the like (not illustrated) to acquire an accurate time of day. In this case, an NTP server refers to a server that acquires and distributes accurate time of day information.

Main Operations Etc. of Guidance System 1

Figure 8:
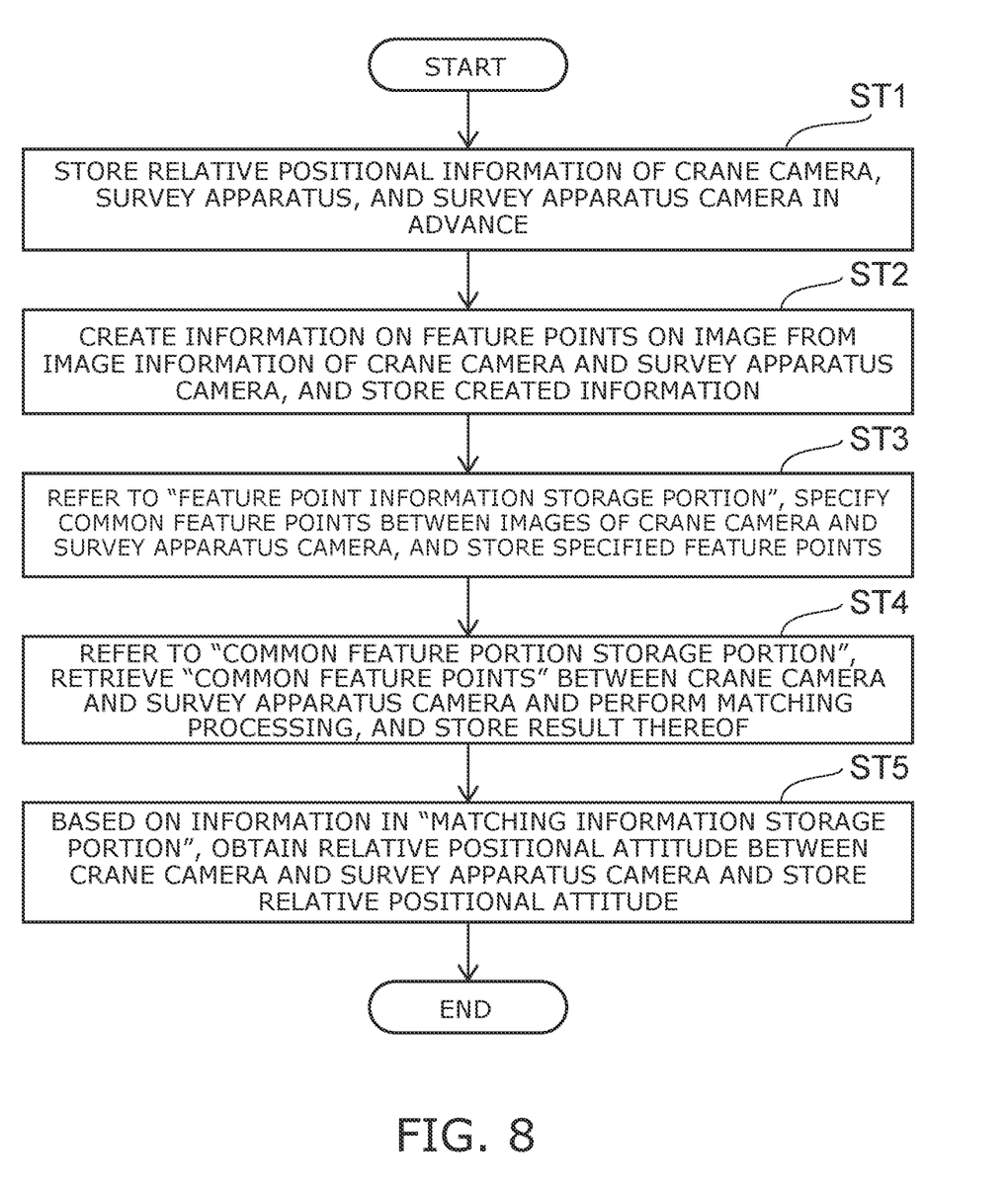
FIG. 8 is a main flow chart showing a guidance preparation process of the guidance system 1 according to the present embodiment.
Figure 9:
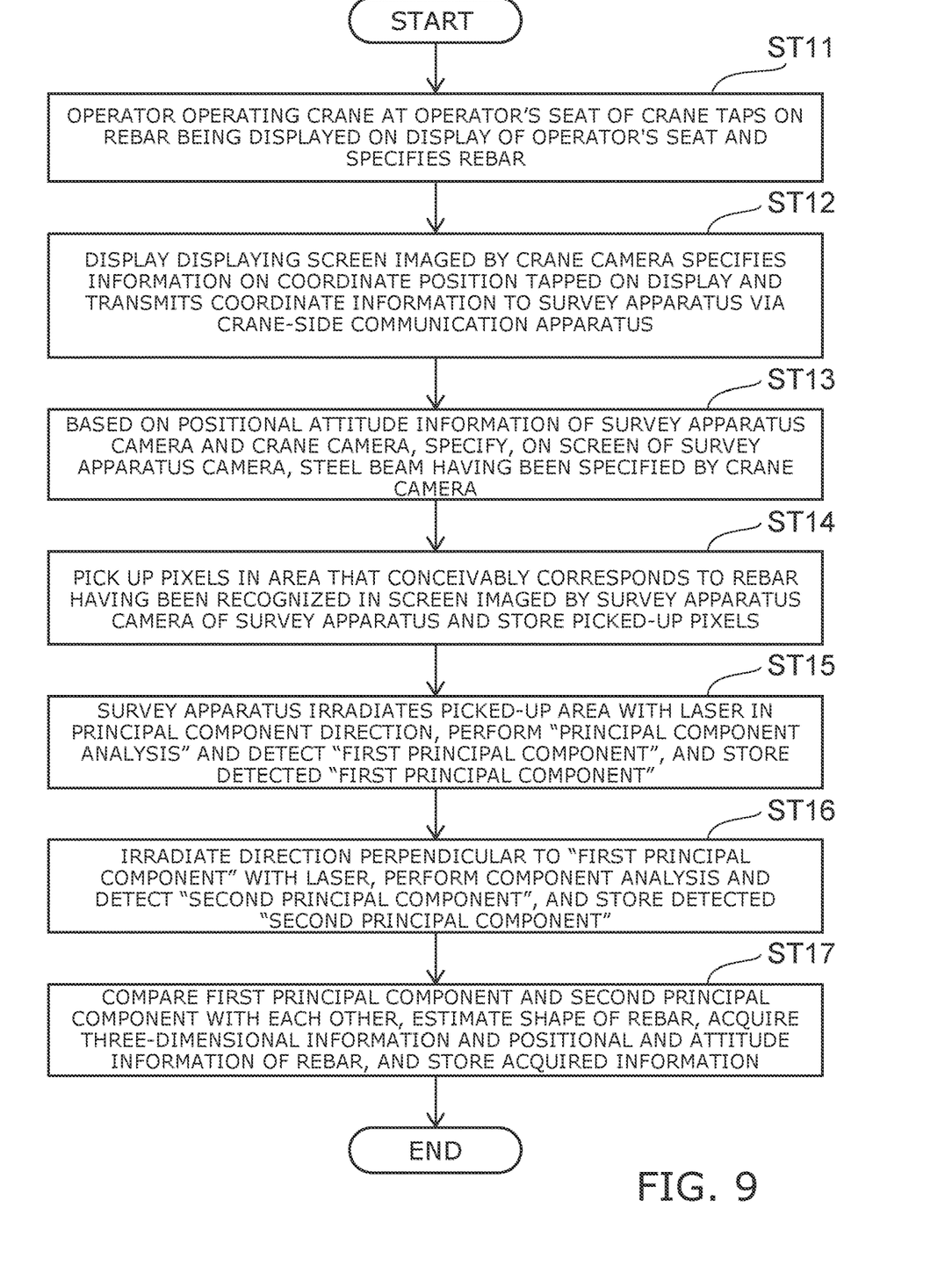
FIG. 9 is a main flow chart showing a guidance process according to the present embodiment.

FIG. 8 is a main flow chart showing a guidance preparation process of the guidance system 1 according to the present embodiment, and FIG. 9 is a main flow chart showing a guidance process. Hereinafter, each of the processes will be described and, at the same time, contents of each block in FIGS. 5 to 7 will also be described.

In the present embodiment, an example will be described in which an operator sits on the operator's seat 210 of the crane 200 shown in FIG. 1 and operates the crane 200 to move the rebar 300 to a target position. In addition, in doing so, the operator is capable of viewing the crane-side display 204 arranged at the operator's seat 210, and the crane-side display 204 is configured to enable the operator to ascertain the rebar 300 in the point of view of the operator. Furthermore, the crane-side display 204 is also configured to display, when the operator uses the crane 200 to move the rebar 300, a guidance screen for assisting the operation of the operator.

Guidance Preparation Process

First, the guidance preparation process shown in FIG. 8 will be described. In step (hereinafter, referred to as "ST") 1 shown in FIG. 8, relative positional information of the crane camera 203, the survey apparatus 10, and the survey apparatus camera 27 is stored in advance in a "relative positional information storage portion 111" shown in FIG. 5 of the "survey apparatus 10".

Next, information on a relative positional attitude of the crane camera 203 and the survey apparatus camera 27 is specified. Specifically, ST2 and subsequent steps are executed. In ST2, a "feature point processing portion (program) 112" shown in FIG. 5 operates to create information of a feature point on images from image information of the crane camera 203 and the survey apparatus camera 27 and cause a "feature point information storage portion 113" shown in FIG. 5 to store the created feature point information.

The process then proceeds to ST3. In ST3, the processing portion 112 operates and refers to the "feature point information storage portion 113", specifies a common feature point on images between the crane camera 203 and the survey apparatus camera 27, and causes a "common feature portion storage portion 114" shown in FIG. 5 to store the common feature point.

The process then proceeds to ST4. In ST4, a "matching processing portion (program) 115" shown in FIG. 5 operates and refers to the "common feature portion storage portion 114", retrieves a "common feature point" between the crane camera 203 and the survey apparatus camera 27 and performs matching processing, and stores a result of the matching processing in a "matching information storage portion 116" shown in FIG. 5.

The process then proceeds to ST5. In ST5, a "relative positional attitude information generating portion (program) 117" shown in FIG. 5 operates and, based on information in the "matching information storage portion 116", obtains a relative positional attitude between the crane camera 203 and the survey apparatus camera 27 and stores the obtained relative positional attitude in a "relative positional attitude information storage portion 121" shown in FIG. 6.

Specifically, using a method such as SfM (Structure from Motion), an object shape portrayed in a supplied image is restored from the image and, at the same time, positional attitudes of the crane camera 203 and the survey apparatus camera 27 are estimated and stored as relative positional attitude information. Therefore, from these processing steps, positional attitudes of the crane camera 203 and the survey apparatus camera 27 can be clearly ascertained and an image of the rebar 300 shown in FIG. 1 or the like having been ascertained from the point of view of the survey apparatus camera 27 can be changed to the point of view of the crane camera 203. According to the adopted configuration, when the relative positional attitude information is updated at this point, positional attitude information of the respective cameras 203 and 27 are acquired once again.

Guidance Process

Next, using the flow chart shown in FIG. 9, an operation of the guidance system according to the present embodiment will be described in specific terms using an example in which the operator operates the crane 200 shown in FIG. 1 and moves the rebar 300 to a target position. First, in ST11 shown in FIG. 9, the operator operating the crane 200 at the operator's seat 210 of the crane 200 taps on the rebar 300 displayed on the crane-side display 204 of the operator's seat 210 to specify the rebar 300.

The process then proceeds to ST12. In ST12, the crane-side display 204 displaying a screen imaged by the crane camera 203 specifies information on a coordinate position having been tapped on the crane-side display 204 and transmits the coordinate information to the survey apparatus 10 via the crane-side communication apparatus 202.

The process then proceeds to ST13. In ST13, the survey apparatus 10 refers to the "relative positional attitude information storage portion 121" shown in FIG. 6 and, based on the positional attitude information of the survey apparatus camera 27 and the crane camera 203, specifies, on a screen of the survey apparatus camera 27, a steel beam 2 having been specified by the crane camera 203.

The process then proceeds to ST14. In ST14, a "pixel processing portion (program) 122" shown in FIG. 6 operates to pick up pixels in an area that conceivably corresponds to the steel beam 2 having been recognized in a screen imaged by the survey apparatus camera 27 of the survey apparatus 10 and stores the picked-up pixels in an "extracted pixel storage portion 123" shown in FIG. 6.

The process then proceeds to ST15. In ST15, a "first principal component detecting portion (program) 124" shown in FIG. 6 operates and refers to the "extracted pixel storage portion 123", the survey apparatus 10 irradiates (not in all directions) the picked-up area with a laser in a "principal component direction (for example, an X-axis direction on the screen)", performs "principal component analysis" and detects a "first principal component", and stores the detected "first principal component" in a "first principal component storage portion 125". At this point, the survey apparatus 10 deflects an irradiation direction of the laser with the optical axis deflecting unit 36 shown in FIG. 2.

The process then proceeds to ST16. In ST16, a "second principal component detecting portion (program) 126" shown in FIG. 6 irradiates a direction (a Y-axis direction on the screen) perpendicular to the "first principal component" with a laser, performs component analysis and detects a "second principal component", and stores the detected "second principal component" in a "second principal component storage portion 127" shown in FIG. 6.

The process then proceeds to ST17. In ST17, an "object shape estimating portion (program) 131" shown in FIG. 7 operates and compares the first principal component and the second principal component in the "first principal component storage portion 125" and the "second principal component storage portion 127" shown in FIG. 6 with each other, estimates shape information of the rebar 300, acquires three-dimensional information and positional and attitude information of the rebar 300 (the shape information, positional information, and attitude information of the steel beam 2), and stores the acquired information in an "object three-dimensional information etc. storage portion 132" shown in FIG. 7.

Specifically, the first principal component and the second principal component are compared with each other, and when both principal components have similar ratios, lengths of components in 12 directions centered on the principal component are studied to determine whether the shape is a square, a circle, or the like. In addition, from the ratio between the first principal component and the second principal component, for example, a rectangle or the like is determined when the first principal component is large.

After estimating the shape as described above, a laser is irradiated by an irradiation method suitable to the shape. For example, when the shape is a circle, the laser is irradiated in a circular shape, and when the shape is a rectangle, the laser is irradiated in a consecutive (zig-zag) Z-shape in a longitudinal direction to perform a measurement (survey). In addition, the three-dimensional information and positional and attitude information of the rebar 300 (the shape information, positional information, and attitude information of the steel beam) are acquired.

As described above, according to the present embodiment, since the survey apparatus 10 generates shape information of a circle or the like and subsequently selects an irradiation method (for example, a circular shape) that is suitable for the shape information, three-dimensional information of an object can be acquired by irradiating only a necessary portion with ranging light, thereby enabling a prompt and efficient survey to be performed.

Compared to cases where the ranging light is irradiated in all directions as was conventional, speed and efficiency of processing can be significantly improved. In addition, in the present embodiment, since scanning involving irradiating the ranging light can be uniformly performed within a necessary range, reliability of acquired information also improves significantly.

Furthermore, in the processes described above, since a position of the steel beam 2 is obtained and a target point to which the steel beam 2 is to be moved is known, a distance, an inclination, and the like to the target point can be determined. In consideration thereof, the survey apparatus 10 refers to the "object three-dimensional information etc. storage portion 132" shown in FIG. 7 and acquires survey information (three-dimensional information and the like) of the rebar 300. In addition, based on a present position, a shape, an inclination, three-dimensional information, and the like of the steel beam 2 that is an object designated by the operator, the three-dimensional information of the rebar 300 is changed to the point of view of the crane camera 203, and the three-dimensional information is transmitted to the crane 200 to be displayed on the crane-side display 204 as point group information or the like.

Conventionally, there was a problem in that, when only an image captured by the crane camera 203 is available, an accurate position (coordinate position) or an accurate shape of the rebar 300 that is an object cannot be ascertained. In contrast, in the present embodiment, the survey apparatus 10 capable of performing three-dimensional surveys enables not only an accurate position of the rebar 300 but also an accurate shape of the object to be ascertained. In addition, based on these pieces of information, the three-dimensional information of the rebar 300 having been surveyed by the survey apparatus 10 can be changed to the point of view of the crane camera 203 and displayed on the crane-side display 204 being viewed by the operator who is operating the crane 200 at the operator's seat 210 thereof.

Accordingly, the operator can ascertain an accurate position and an accurate shape of the rebar 300 and even a blind spot portion of the crane camera 203 can be ascertained on the crane-side display 204. Therefore, when suspending the rebar 300 with the crane 200 and moving the rebar 300 to a target point, the operator can perform the operation while accurately ascertaining the position and the shape of the rebar 300. Furthermore, as will be described later, by displaying a difference or the like that represents difference information with respect to the target point of movement of the rebar 300 on the crane-side display 204, the rebar 300 can be more accurately moved to the target point.

Specific Mode of Display on Crane-side Display 204

First, the crane-side display 204 can display the steel beam 2 in the point of view of the crane camera 203 and, at the same time, the crane-side display 204 can indicate a portion of the steel beam 2 that is in a blind spot of the crane camera 203 using imaginary lines or the like or point group data.

Figure 10:
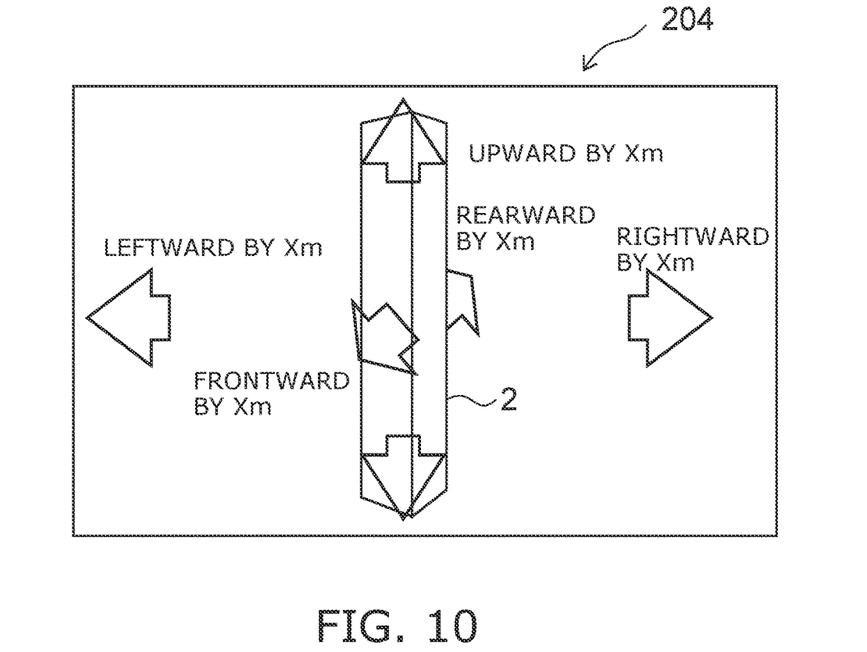
FIG. 10 is a screen example showing information on a deviation or the like of a rebar 300.

In addition, a configuration may be adopted in which the steel beam 2 displayed on the crane-side display 204 is accompanied with difference information such as "a direction in which the steel beam 2 is to be moved" or "inclination". For example, as shown in FIG. 10, upward by X m, rearward by X m, rightward by X m, frontward by X m, downward by X m, leftward by X m, and the like may be indicated by arrows. When a deviation of the steel beam 2 from the target point or the like is indicated by an arrow or the like as shown in FIG. 10, a wider arrow may be displayed when the deviation is larger. FIG. 10 is a screen example showing information on a deviation or the like of the rebar 300.

Figure 11:
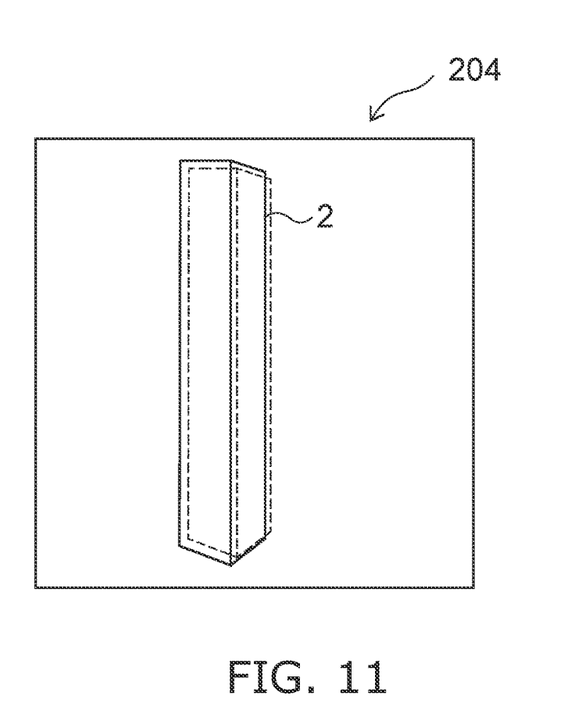
FIG. 11 is a screen example showing a relationship between the rebar 300 and a target position.
Figure 12:
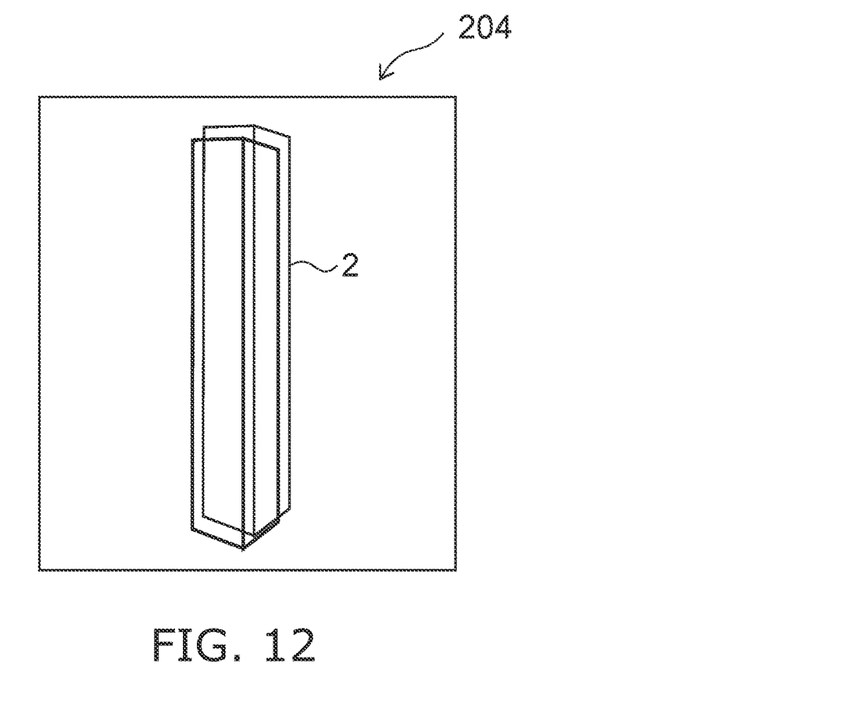
FIG. 12 is another screen example showing a relationship between the rebar 300 and a target position.

Furthermore, when the target position is to the rear of the present position of the steel beam 2 as shown in FIG. 11, the target position may be indicated by a dotted line, and when the target position is to the front of the present position of the steel beam 2 as shown in FIG. 12, the target position may be indicated by a solid bold line or the like. In this manner, by showing the present position and the target position of the rebar 300 from a same point of view so as to overlap with each other in a same screen, the operator of the crane 200 can accurately and readily move the rebar 300 to the target position. FIGS. 11 and 12 are screen examples showing a relationship between the rebar 300 and a target position.

Figure 13:
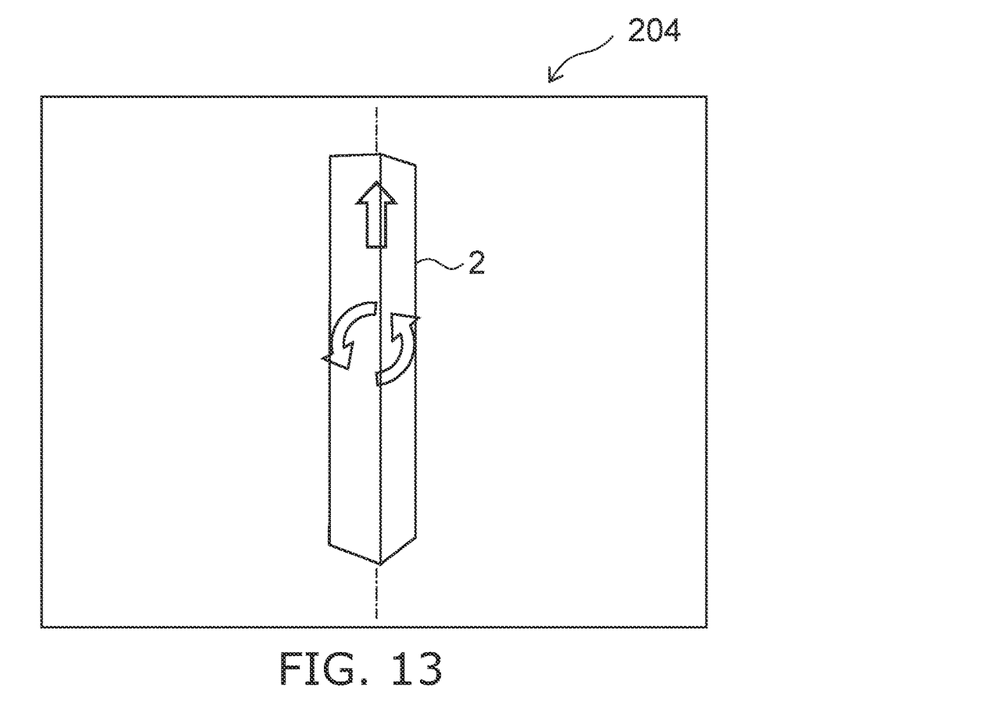
FIG. 13 is a screen example in which a degree of inclination of the rebar 300 is indicated by an arrow.

Moreover, in the present embodiment, an "inclination guidance mode" can also be displayed as shown in FIG. 13 in addition to a "movement guidance mode" such as that described above. FIG. 13 is a screen example in which a degree of inclination of the rebar 300 is indicated by an arrow and, as shown in FIG. 13, a configuration is adopted in which the operator can readily ascertain that the rebar 300 is inclined and ascertain a degree of inclination of the rebar 300 by simply viewing the rebar 300 and the arrow on the crane-side display 204.

In the present embodiment, a configuration can be adopted in which a warning is displayed when an obstacle is present between the target position and the present position behind the steel beam 2 (in a blind spot of the operator) or the like. A configuration can be adopted in which the warning is issued by a sound or a vibration when, for example, the steel beam 2 is about to come into contact with the obstacle or the like.

While the present embodiment has been described using an example of the crane camera 203 and the survey apparatus camera 27, the present invention is not limited thereto and other cameras such as a camera of a mobile terminal may be additionally arranged. In this case, a configuration may be adopted in which survey (measurement) data of the rebar 300 or the like that is an object is displayed on a display of the mobile terminal from a point of view of the camera of the mobile terminal.

In addition, a camera may be coordinated on eyeglasses worn by a worker or the like or may be mounted to a part of the body such as an arm, a leg, or the head. In this case, a configuration may be adopted in which a camera image and survey data are displayed on a display that is installed in the eyeglasses. Furthermore, when a camera is mounted to a mobile body such as eyeglasses, processing is to be continually executed and a positional attitude of the camera is to be continuously updated using a technique of constructing a map of an environment while simultaneously estimating an agent's location within the environment such as SLAM (Simultaneous Localization and Mapping).

While the present embodiment has been described above using an example in which the present invention is realized as an apparatus, the present invention is not limited thereto and a program to be executed by a computer may be distributed while being stored in storage media such as a magnetic disk (a floppy (registered trademark) disk, a hard disk, or the like), an optical disk (a CD-ROM, a DVD, or the like), an magneto optical disk (MO), and a semiconductor memory.

In addition, the storage media may be any storage media that are capable of storing a program and can be read by a computer. A storage format of the storage media is not particularly limited.

Furthermore, an OS (operating system) running on a computer based on instructions of a program having been installed to the computer from a storage medium, MW (middleware) such as database management software and network software, and the like may execute a part of processing steps for realizing the present embodiment.

Moreover, the storage media in the present invention are not limited to media that are independent of a computer and include storage media to which a program transmitted through a LAN, the Internet, or the like has been downloaded and which store or temporarily store the downloaded program.

In addition, the computer in the present invention need only execute respective processing steps in the present embodiment based on a program stored in a storage medium and may be an apparatus constituted by a single personal computer (PC) or the like or a system or the like in which a plurality of apparatuses are connected via a network.

Furthermore, the computer in the present invention is not limited to a personal computer and collectively refers to devices and apparatuses capable of realizing functions of the present invention including arithmetic processing units and microcomputers included in information processing devices.

An embodiment of the present invention has been described above. However, it is to be understood that the present invention is not limited to the embodiment described above and that various modifications can be made without departing from the scope of the appended claims.

What is claimed is:

1. A guidance system comprising:
    a survey apparatus that surveys an object from a point of view that differs from a point of view of a user; and
    a display portion that displays the object from the point of view of the user,
    wherein the guidance system is configured to generate shape information of the object by irradiating at least only one of the object and a periphery thereof with ranging light of the survey apparatus and receiving reflected ranging light from the object, and is capable of acquiring three-dimensional information of the object by selecting and executing an irradiation method of the ranging light that is suitable for the generated shape information, and wherein
    the survey apparatus is configured to perform ranging by irradiating the object with ranging light and receiving reflected ranging light from the object, and
    survey information of the object having been surveyed by the survey apparatus is changed to the point of view of the user and displayed on the display portion.

2. The guidance system according to claim 1 comprising:
    a survey apparatus-side imaging apparatus that images the object from a survey point of view of the survey apparatus; and
    a user-side imaging apparatus that images the object from the point of view of the user, wherein the survey information of the survey apparatus is changed to the point of view of the user based on information on a relative positional attitude between the survey apparatus-side imaging apparatus and the user-side imaging apparatus and displayed on the display portion.

3. The guidance system according to claim 2, wherein the guidance system acquires information on a target position to which the object is to be moved and displays difference information between present position information and the target position information on the display portion in the point of view of the user.

4. The guidance system according to claim 3, wherein the guidance system acquires information on a target position to which the object is to be moved and displays difference information between present position information and the target position information on the display portion in the point of view of the user.

5. The guidance system according to claim 1, wherein the guidance system acquires information on a target position to which the object is to be moved and displays difference information between present position information and the target position information on the display portion in the point of view of the user.

6. A control method of a guidance system including a survey apparatus that surveys an object from a point of view that differs from a point of view of a user and a display portion that displays the object from the point of view of the user, the control method of the guidance system comprising:

the guidance system generating shape information of the object by irradiating at least only one of the object and a periphery thereof with ranging light of the survey apparatus and receiving reflected ranging light from the object, and acquiring three-dimensional information of the object by selecting and executing an irradiation method of ranging light that is suitable for the generated shape information;

the survey apparatus performing ranging by irradiating the object with ranging light and receiving reflected ranging light from the object; and changing survey information of the object having been surveyed by the survey apparatus to the point of view of the user and displaying the survey information on the display portion.

7. A non-transitory computer readable storage medium comprising a control program of a guidance system including a survey apparatus that surveys an object from a point of view that differs from a point of view of a user and a display portion that displays the object from the point of view of the user, the control program causing the guidance system to execute functions of:

the guidance system generating shape information of the object by irradiating at least only one of the object and a periphery thereof with ranging light of the survey apparatus and receiving reflected ranging light from the object, and acquiring three-dimensional information of the object by selecting and executing an irradiation method of the ranging light that is suitable for the generated shape information;

the survey apparatus performing ranging by irradiating the object with ranging light and receiving reflected ranging light from the object; and changing survey information of the object having been surveyed by the survey apparatus to the point of view of the user and displaying the survey information on the display portion.

* * * * *